(12) United States Patent
Suzuki et al.

(10) Patent No.: US 9,478,354 B2
(45) Date of Patent: Oct. 25, 2016

(54) INDUCTOR MANUFACTURING METHOD

(71) Applicant: MURATA MANUFACTURING CO., LTD., Kyoto-fu (JP)

(72) Inventors: Hironori Suzuki, Kyoto-fu (JP); Yasushi Takeda, Kyoto-fu (JP); Noriko Shimizu, Kyoto-fu (JP); Yoichi Nakatsuji, Kyoto-fu (JP); Gota Shinohara, Kyoto-fu (JP); Junji Kurobe, Kyoto-fu (JP); Kuniaki Yosui, Kyoto-fu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 14/613,784

(22) Filed: Feb. 4, 2015

(65) Prior Publication Data

US 2015/0235765 A1 Aug. 20, 2015

(30) Foreign Application Priority Data

Feb. 20, 2014 (JP) .................. 2014-030715

(51) Int. Cl.
*H01F 41/04* (2006.01)
*H01F 17/00* (2006.01)
(Continued)

(52) U.S. Cl.
CPC ........ *H01F 41/046* (2013.01); *H01F 17/0013* (2013.01); *B32B 37/02* (2013.01);
(Continued)

(58) Field of Classification Search
CPC ............. H01F 41/046; H01F 17/0013; H01F 2017/048; C09K 13/00; B32B 37/02; B32B 2307/202; B32B 2457/00
See application file for complete search history.

(56) References Cited

U.S. PATENT DOCUMENTS

| 2001/0008794 A1* | 7/2001 | Akagawa ................ H01L 24/97 438/620 |
| 2005/0205294 A1* | 9/2005 | Yamashita ............... H05K 3/20 174/255 |

(Continued)

FOREIGN PATENT DOCUMENTS

| JP | H09-35939 A | 2/1997 |
| JP | 2004-221331 A | 8/2004 |

(Continued)

OTHER PUBLICATIONS

An Office Action; "Notice of Reasons for Rejection," issued by the Japanese Patent Office on Jan. 5, 2016, which corresponds to Japanese Patent Application No. 2014-030715 and is related to U.S. Appl. No. 14/613,784; with English language translation.

*Primary Examiner* — Anita Alanko
(74) *Attorney, Agent, or Firm* — Studebaker & Brackett PC

(57) ABSTRACT

An inductor manufacturing method includes a first step of press bonding a Cu foil onto a non-magnetic resin sheet, a second step of forming a conductor pattern by performing etching on the Cu foil, a third step of press bonding another non-magnetic resin sheet onto the conductor pattern, and a via conductor formation step of forming a via conductor that penetrates through the other resin sheet and leads to the conductor pattern. The method further includes a step of forming a body in which resin having magnetism is provided outside of a coil, by press bonding magnetic-powder-containing resin sheets onto a multilayer body, obtained by a manufacturing method including the first to third steps and the via conductor formation step, and then thermally curing the magnetic-powder-containing resin sheets.

3 Claims, 16 Drawing Sheets

(51) Int. Cl.
*H01F 17/04* (2006.01)
*B32B 37/02* (2006.01)
*C09K 13/00* (2006.01)

(52) U.S. Cl.
CPC ...... *B32B2307/202* (2013.01); *B32B 2457/00* (2013.01); *C09K 13/00* (2013.01); *H01F 2017/048* (2013.01)

(56) References Cited

U.S. PATENT DOCUMENTS

| | | | |
|---|---|---|---|
| 2007/0030107 | A1 | 2/2007 | Waffenschmidt et al. |
| 2010/0255638 | A1* | 10/2010 | Ohba .................. H01F 41/041 438/113 |
| 2010/0308949 | A1* | 12/2010 | Lim ...................... H01F 17/04 336/218 |
| 2011/0189501 | A1* | 8/2011 | Fujisawa ................ B32B 15/08 428/623 |
| 2012/0105188 | A1* | 5/2012 | Lim ................... H01F 17/0033 336/200 |
| 2013/0113593 | A1* | 5/2013 | Jeong ................. H01F 17/0013 336/200 |
| 2014/0001397 | A1* | 1/2014 | Park ........................ H01F 1/01 252/62.54 |
| 2014/0043129 | A1* | 2/2014 | Wi .......................... H01F 27/29 336/192 |
| 2014/0292470 | A1* | 10/2014 | Yokoyama ................ H01F 5/00 336/200 |
| 2015/0237738 | A1* | 8/2015 | Wolfel .................... H05K 3/10 174/251 |

FOREIGN PATENT DOCUMENTS

| | | | | |
|---|---|---|---|---|
| JP | 2007-067214 | A | | 3/2007 |
| JP | 2007-504673 | A | | 3/2007 |
| JP | 2007067214 | A | * | 3/2007 |
| JP | 2013-102127 | A | | 5/2013 |
| JP | 2014-011467 | A | | 1/2014 |

* cited by examiner

FIG. 3
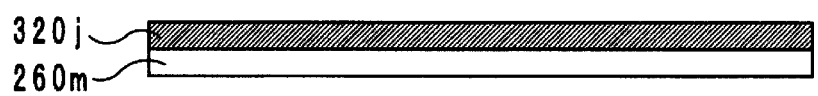
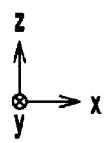
FIG. 4
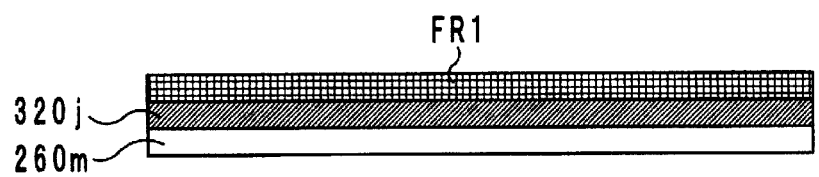
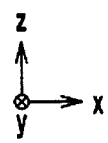

FIG. 5
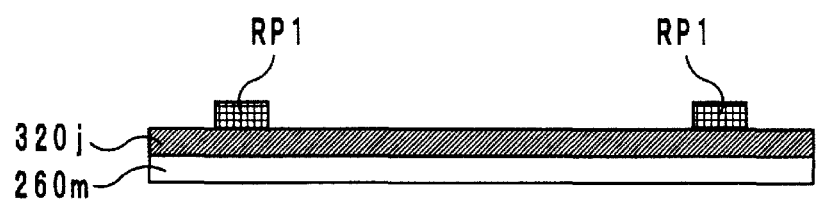
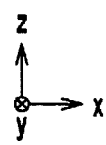
FIG. 6
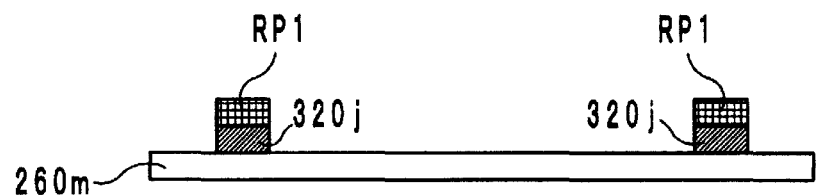
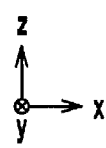

FIG. 7
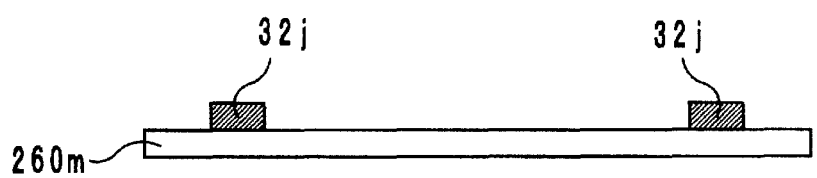
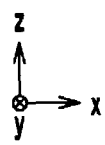
FIG. 8
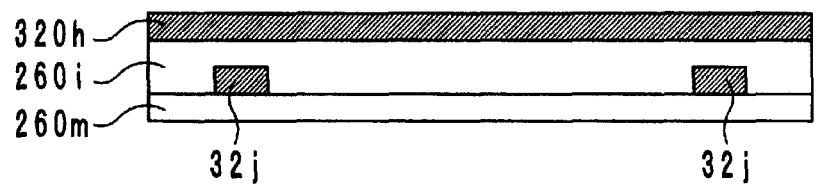
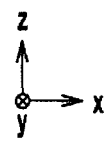

FIG. 9
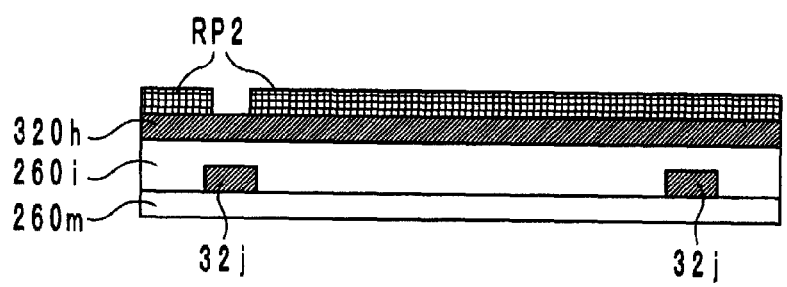
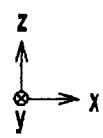
FIG. 10
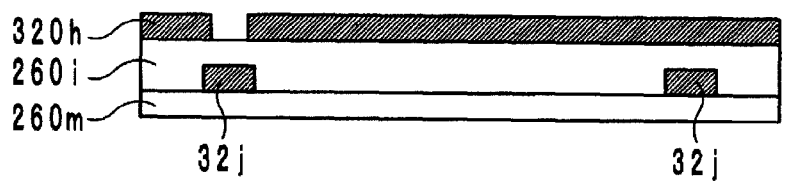
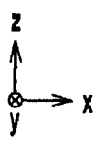

FIG. 11
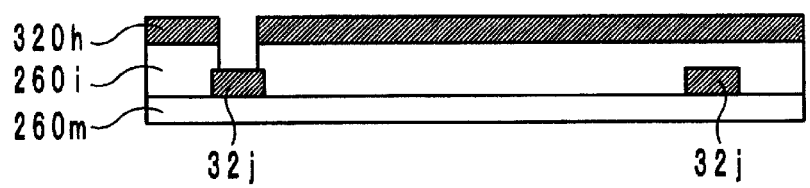
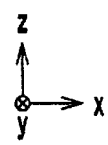
FIG. 12
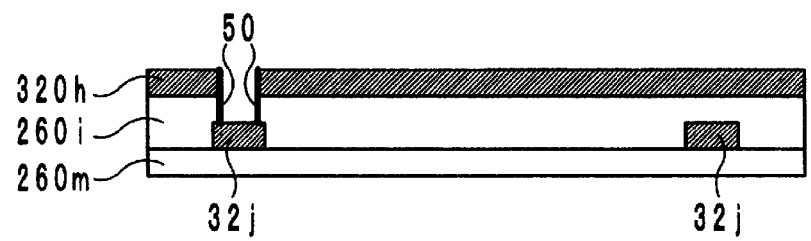
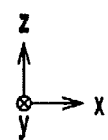

FIG. 13
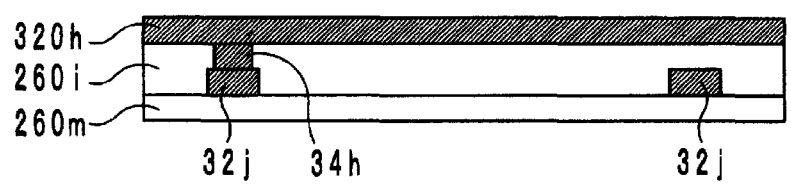
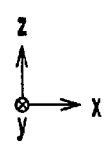
FIG. 14
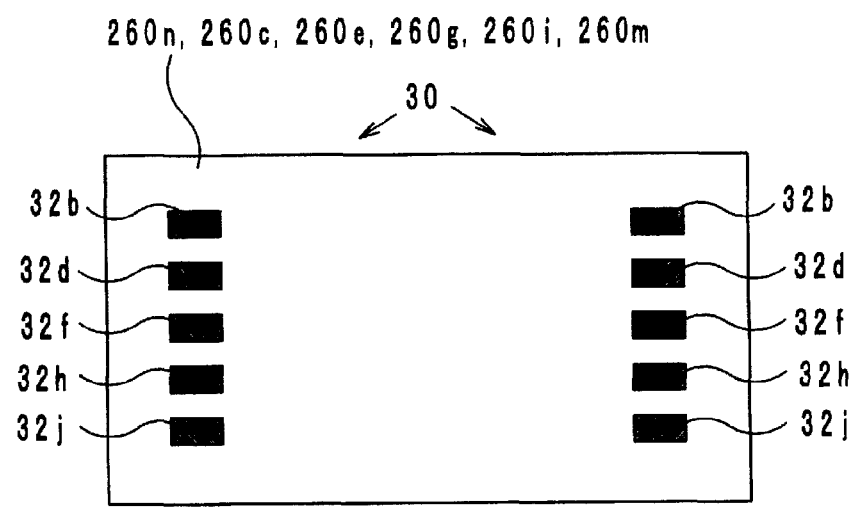
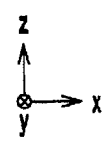

FIG. 16
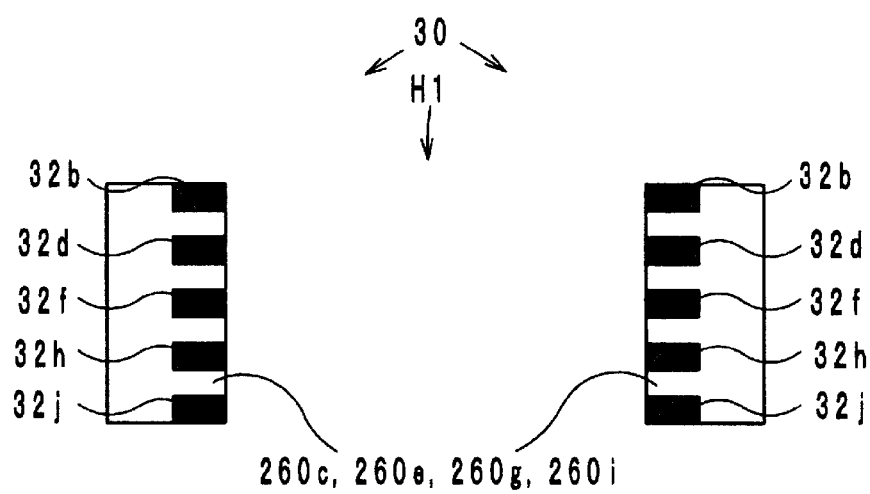
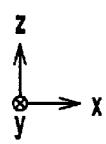

FIG. 18
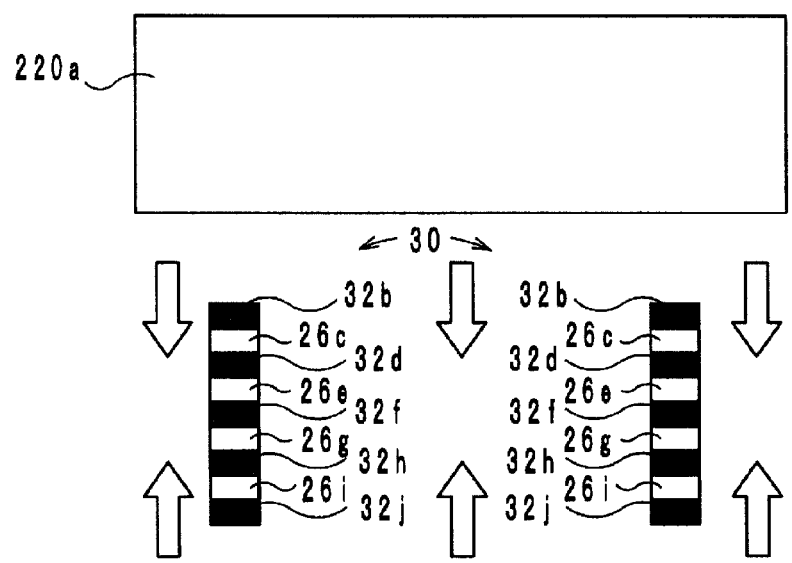
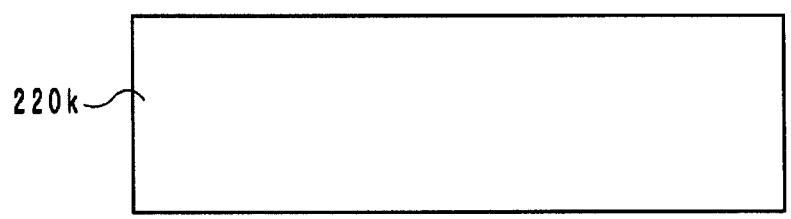
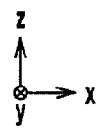

FIG. 19
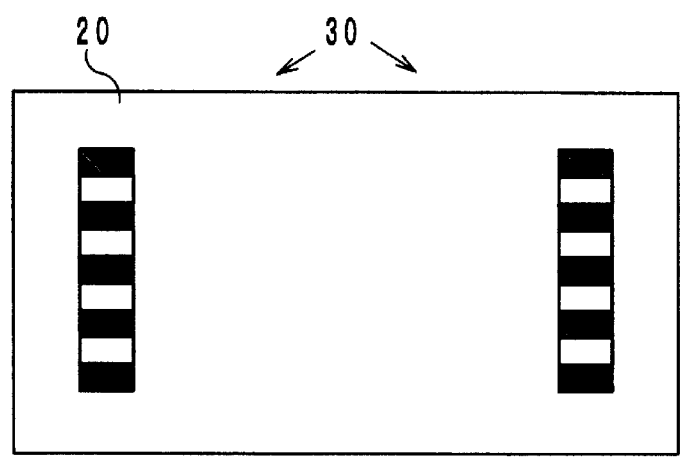
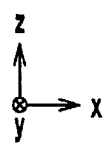

FIG. 21
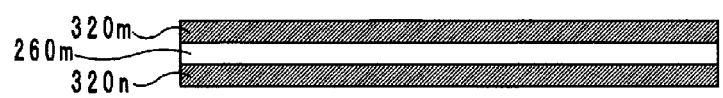
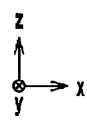
FIG. 22
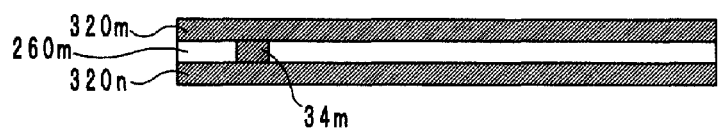
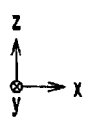

INDUCTOR MANUFACTURING METHOD

CROSS REFERENCE TO RELATED APPLICATIONS

This application claims benefit of priority to Japanese Patent Application No. 2014-030715 filed Feb. 20, 2014, the entire content of which is incorporated herein by reference.

TECHNICAL FIELD

The present technical field relates to an inductor manufacturing method.

BACKGROUND

The multilayer inductor manufacturing method described in Japanese Unexamined Patent Application Publication No. 2013-102127 is a known example of an inductor manufacturing method of the related art. This type of multilayer inductor manufacturing method (hereafter referred to as multilayer inductor manufacturing method of the related art) includes a step in which slurry sheets are stacked and then sintered to form a multilayer body. However, in the multilayer inductor manufacturing method of the related art, since the multilayer inductor is exposed to a high temperature when being sintered, there is a risk that structural defects such as interlayer peeling and cracks may be generated.

SUMMARY

Accordingly, an object of the present disclosure is to provide an inductor manufacturing method that is capable of suppressing generation of structural defects such as interlayer peeling and cracks.

An inductor manufacturing method according to a first embodiment of the present disclosure is a method for manufacturing an inductor having a helical built-in coil formed of a conductor pattern and a via conductor, the method including: a first step of press bonding a first conductor layer onto a first non-magnetic material layer composed of a non-magnetic resin; a second step of forming the conductor pattern by performing etching on the press-bonded first conductor layer; a third step of press bonding a second non-magnetic material layer composed of a non-magnetic resin onto the conductor pattern; a via conductor formation step of forming a via conductor that penetrates through the first non-magnetic material layer or the second non-magnetic material layer and leads to the conductor pattern; and a step of forming a body in which a resin having magnetism is provided outside a coil by subjecting a multilayer body having a built-in coil, and obtained by a manufacturing method including the first step to the third step and the via conductor formation step, to press bonding while interposed between magnetic-powder-containing resin sheets and then thermally curing the magnetic-powder-containing resin sheets.

An inductor manufacturing method according to a second embodiment of the present disclosure is a method for manufacturing an inductor having a helical built-in coil formed of a conductor pattern and a via conductor, the method including: a first step of press bonding a first conductor layer onto a first non-magnetic material layer composed of a non-magnetic resin; a second step of forming the conductor pattern by performing etching on the press-bonded first conductor layer; a third step of press bonding a second non-magnetic material layer composed of a non-magnetic resin onto the conductor pattern; a fourth step of press bonding a second conductor layer onto the second non-magnetic material layer; a fifth step of forming a via that penetrates through the second conductor layer and the second non-magnetic material layer and leads to the conductor pattern; a sixth step of forming the via conductor by performing plating on the via; and a step of forming a body in which a resin having magnetism is provided outside a coil by subjecting a multilayer body, which has a built-in coil and is obtained by repeating the second step to the sixth step, to press bonding after the sixth step while interposed between magnetic-powder-containing resin sheets and then thermally curing the magnetic-powder-containing resin sheets.

In the inductor manufacturing method according to either of the embodiments of the present disclosure, a resin is used as a material of the inductor and the resin is press bonded and cured. In addition, a conductor pattern is formed by performing etching on a conductor layer. Furthermore, when forming portions that are to have magnetism, magnetic-powder-containing resin sheets are used and the resin sheets are press bonded together and cured. Thus, an inductor manufacturing method according to an embodiment of the present disclosure does not include a high-temperature heat treatment step such as sintering. Therefore, the occurrence of structural defects such as interlayer peeling and cracks can be suppressed in an inductor manufactured using an inductor manufacturing method according to an embodiment of the present disclosure.

Other features, elements, characteristics and advantages of the present disclosure will become more apparent from the following detailed description of preferred embodiments of the present disclosure with reference to the attached drawings.

BRIEF DESCRIPTION OF THE DRAWINGS

FIG. 3 is a sectional view of the inductor during its manufacture.

FIG. 4 is a sectional view of the inductor during its manufacture.

FIG. 5 is a sectional view of the inductor during its manufacture.

FIG. 6 is a sectional view of the inductor during its manufacture.

FIG. 7 is a sectional view of the inductor during its manufacture.

FIG. 8 is a sectional view of the inductor during its manufacture.

FIG. 9 is a sectional view of the inductor during its manufacture.

FIG. 10 is a sectional view of the inductor during its manufacture.

FIG. 11 is a sectional view of the inductor during its manufacture.

FIG. 12 is a sectional view of the inductor during its manufacture.

FIG. 13 is a sectional view of the inductor during its manufacture.

FIG. 14 is a sectional view of the inductor during its manufacture.

FIG. 16 is a sectional view of the inductor during its manufacture.

FIG. 18 is a sectional view of the inductor during its manufacture.

FIG. 19 is a sectional view of the inductor during its manufacture.

FIG. 21 is a sectional view of an inductor according to a modification during its manufacture.

FIG. 22 is a sectional view of the inductor according to the modification during its manufacture.

DETAILED DESCRIPTION

Hereafter, an inductor manufacturing method according to an embodiment and an inductor manufactured using the inductor manufacturing method will be described.

Outline Configuration of Inductor

Figure 1:
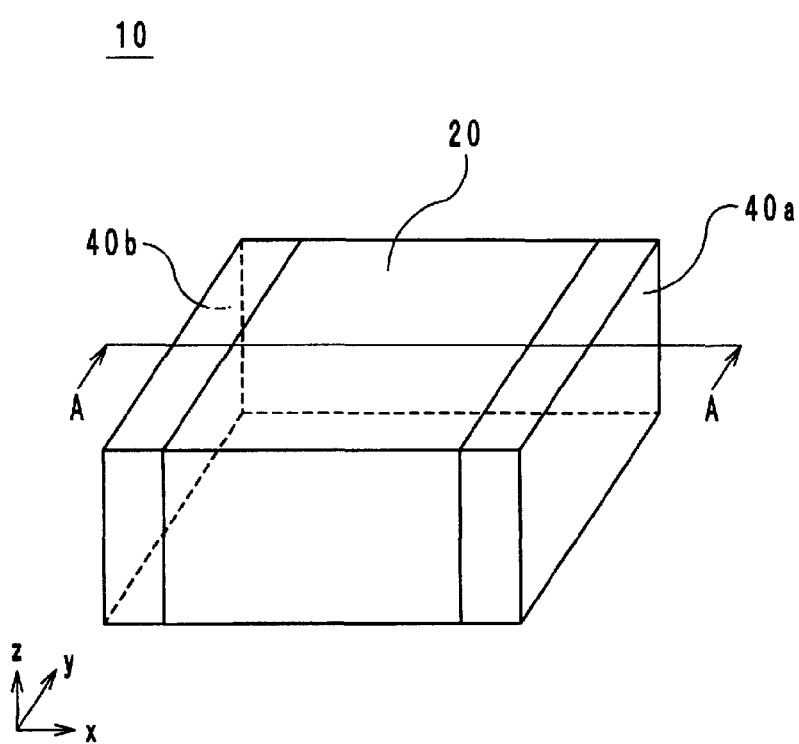
FIG. 1 is a perspective view of the exterior of an inductor according to an embodiment.

Hereafter, the outline configuration of an inductor manufactured using an inductor manufacturing method according to an embodiment will be described while referring to FIG. 1. A stacking direction of an inductor 10 is defined as a z-axis direction, and a direction that extends along the long edges of the inductor 10 and a direction that extends along the short edges of the inductor 10 when viewed in plan from the z-axis direction are respectively defined as an x-axis direction and a y-axis direction. In addition, a surface that is located on the positive side in the z-axis direction is referred to as an upper surface and a surface that is located on the negative side in the z-axis direction is referred to as a lower surface. The x axis, the y axis and the z axis are orthogonal to one another.

The inductor 10 includes a body 20, a coil 30 and outer electrodes 40a and 40b. In addition, the inductor 10 has a substantially rectangular parallelepiped shape as illustrated in FIG. 1.

Configuration of Body

Hereafter, the configuration of the body 20 will be described with reference to FIG. 2. The body 20 is a rectangular-parallelepiped-shaped member whose constituent material is an insulator composed of a magnetic material (such as a magnetic-powder-containing resin) and a non-magnetic material (such as glass, alumina and composite materials thereof). In addition, coil conductors 32b, 32d, 32f, 32h and 32j, which will be described later, are arranged inside the body 20. Here, if the body 20 is conveniently divided into layers in which the coil conductors 32b, 32d, 32f, 32h and 32j are arranged and layers in which the coil conductors 32b, 32d, 32f, 32h and 32j are not arranged, the body 20 is formed by stacking insulator layers 22a to 22k in order from the positive side in the z-axis direction. In addition, each of the insulator layers 22a to 22k has a substantially rectangular shape when viewed in plan from the z-axis direction.

Figure 2:
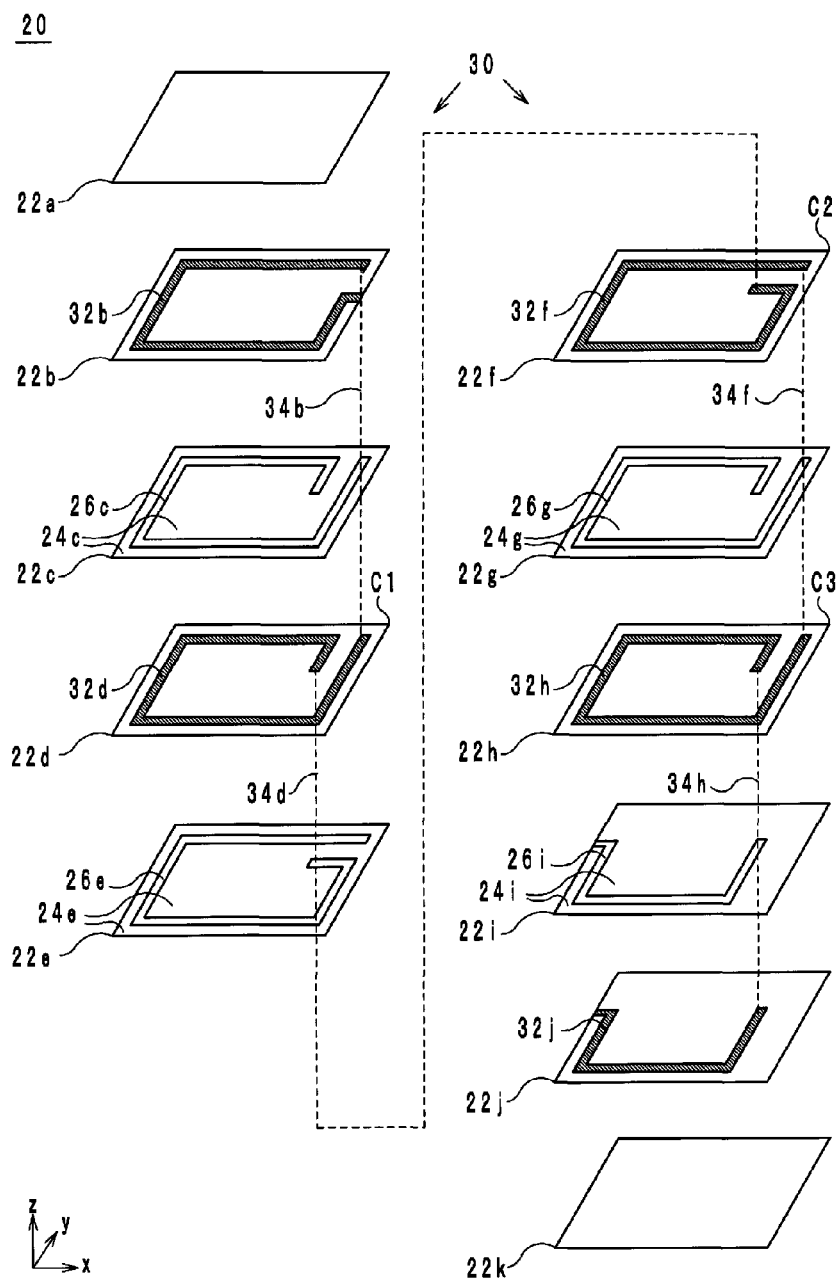
FIG. 2 is an exploded perspective view of the inductor according to the embodiment.

The insulator layer 22a is located in an end portion of the body 20 on the positive side in the z-axis direction as illustrated in FIG. 2. In addition, the insulator layer 22a is formed of a magnetic material.

The insulator layer 22b is arranged below the insulator layer 22a and is composed of a magnetic material. The coil conductor 32b, which will be described later, is arranged in the insulator layer 22b.

The insulator layer 22c is arranged below the insulator layer 22b. In addition, the insulator layer 22c is formed of a magnetic material layer 24c composed of a magnetic material and a non-magnetic material layer 26c composed of a non-magnetic material. The non-magnetic material layer 26c is a substantially band-shaped non-magnetic material layer provided parallel to an outer edge of the insulator layer 22c and has a substantially square annular shape when viewed in plan from the z-axis direction. The magnetic material layer 24c is provided around the periphery of the non-magnetic material layer 26c and inside the substantially square annular shape of the non-magnetic material layer 26c when viewed in plan from the z-axis direction.

The insulator layer 22d is arranged below the insulator layer 22c and is composed of a magnetic material. The coil conductor 32d, which will be described later, is arranged in the insulator layer 22d.

The insulator layer 22e is arranged below the insulator layer 22d. In addition, the insulator layer 22e is formed of a magnetic material layer 24e composed of a magnetic material and a non-magnetic material layer 26e composed of a non-magnetic material. The non-magnetic material layer 26e is a substantially band-shaped non-magnetic material layer provided parallel to an outer edge of the insulator layer 22e and has a substantially square annular shape when viewed in plan from the z-axis direction. The magnetic material layer 24e is provided around the periphery of the non-magnetic material layer 26e and inside the substantially square annular shape of the non-magnetic material layer 26e when viewed in plan from the z-axis direction.

The insulator layer 22f is arranged below the insulator layer 22e and is composed of a magnetic material. The coil conductor 32f, which will be described later, is arranged in the insulator layer 22f.

The insulator layer 22g is arranged below the insulator layer 22f. In addition, the insulator layer 22g is formed of a magnetic material layer 24g composed of a magnetic material and a non-magnetic material layer 26g composed of a non-magnetic material. The non-magnetic material layer 26g is a substantially band-shaped non-magnetic material layer provided parallel to an outer edge of the insulator layer 22g and has a substantially square annular shape when viewed in plan from the z-axis direction. The magnetic material layer 24g is provided around the periphery of the non-magnetic material layer 26g and inside the substantially square annular shape of the non-magnetic material layer 26g when viewed in plan from the z-axis direction.

The insulator layer 22h is arranged below the insulator layer 22g and is composed of a magnetic material. The coil conductor 32h, which will be described later, is arranged in the insulator layer 22h.

The insulator layer 22i is arranged below the insulator layer 22h. In addition, the insulator layer 22i is formed of a magnetic material layer 24i composed of a magnetic material and a non-magnetic material layer 26i composed of a non-magnetic material. The non-magnetic material layer 26i is a substantially band-shaped non-magnetic material layer provided parallel to outer edges of the insulator layer 22i on both the positive and negative sides in the x-axis direction and parallel to an outer edge of the insulator layer 22i on the negative side in the y-axis direction, and has a substantially backward C shape when viewed in plan from the z-axis direction. The magnetic material layer 24i is provided in portions of the insulator layer 22i other than portions where the non-magnetic material layer 26i is provided.

The insulator layer 22j is arranged below the insulator layer 22i and is composed of a magnetic material. The coil conductor 32j, which will be described later, is arranged in the insulator layer 22j.

The insulator layer 22k is arranged in an end portion of the body 20 on the negative side in the z-axis direction. In addition, the insulator layer 22k is formed of a magnetic material.

Configuration of Outer Electrodes

Hereafter, the configuration of the outer electrodes 40a and 40b will be described with reference to FIG. 1. As illustrated in FIG. 1, the outer electrode 40a is provided so as to cover a surface of the body 20 on the positive side in the x-axis direction and part of each of the surfaces surrounding that surface. In addition, the outer electrode 40b is provided so as to cover a surface of the body 20 on the negative side in the x-axis direction and part of each of the surfaces surrounding that surface. The material of the outer electrodes 40a and 40b is a conductive material such as Au, Ag, Pd, Cu or Ni.

Configuration of Coil

Hereafter, the configuration of the coil 30 will be described with reference to FIG. 2. As illustrated in FIG. 2, the coil 30 is arranged inside the body 20 and is formed of the coil conductors 32b, 32d, 32f, 32h and 32j and via conductors 34b, 34d, 34f and 34h. In addition, the coil 30 has a substantially helical shape and a central axis of the helical shape is parallel to the z axis. In short, the coil 30 has a helical shape that loops around while advancing in the z-axis direction. The material of the coil 30 is a conductive material such as Au, Ag, Pd, Cu, Ni or an alloy of any of these metals.

The coil conductor 32b is a line-shaped conductor provided parallel to an outer edge of the insulator layer 22b. Therefore, the coil conductor 32b has a substantially square annular shape when viewed in plan from the z-axis direction. In addition, a lower surface of the coil conductor 32b is in contact with the non-magnetic material layer 26c. One end of the coil conductor 32b is exposed at the surface of the body from an outer edge of the insulator layer 22b on the positive side in the x-axis direction and is connected to the outer electrode 40a. The other end of the coil conductor 32b is connected to the via conductor 34b, which penetrates through the insulator layer 22c in the z-axis direction, in the vicinity of a corner formed by an outer edge of the insulator layer 22b on the positive side in the x-axis direction and an outer edge of the insulator layer 22b on the positive side in the y-axis direction.

The coil conductor 32d is a line-shaped conductor provided parallel to an outer edge of the insulator layer 22d. Therefore, the coil conductor 32d has a substantially square annular shape when viewed in plan from the z-axis direction. In addition, the upper surface of the coil conductor 32d contacts the non-magnetic material layer 26c and the lower surface of the coil conductor 32d contacts the non-magnetic material layer 26e. One end of the coil conductor 32d is connected to the via conductor 34b in the vicinity of a corner C1 formed by an outer edge of the insulator layer 22d on the positive side in the x-axis direction and an outer edge of the insulator layer 22d on the positive side in the y-axis direction. In addition, the other end of the coil conductor 32d is located in the vicinity of the corner C1 and a little further toward the center of the insulator layer 22d than the one end of the coil conductor 32d, and is connected to the via conductor 34d, which penetrates through the insulator layer 22e in the z-axis direction.

The coil conductor 32f is a line-shaped conductor provided parallel to an outer edge of the insulator layer 22f. Therefore, the coil conductor 32f has a substantially square annular shape when viewed in plan from the z-axis direction. In addition, the upper surface of the coil conductor 32f contacts the non-magnetic material layer 26e and the lower surface of the coil conductor 32f contacts the non-magnetic material layer 26g. One end of the coil conductor 32f is connected to the via conductor 34d in the vicinity of a corner C2 formed by an outer edge of the insulator layer 22f on the positive side in the x-axis direction and an outer edge of the insulator layer 22f on the positive side in the y-axis direction. In addition, the other end of the coil conductor 32f is located in the vicinity of the corner C2 and a little further toward the outer edge of the insulator layer 22f than the one end of the coil conductor 32f, and is connected to the via conductor 34f, which penetrates through the insulator layer 22g in the z-axis direction.

The coil conductor 32h is a line-shaped conductor provided parallel to an outer edge of the insulator layer 22h. Therefore, the coil conductor 32h has a substantially square annular shape when viewed in plan from the z-axis direction. In addition, the upper surface of the coil conductor 32h contacts the non-magnetic material layer 26g and the lower surface of the coil conductor 32h contacts the non-magnetic material layer 26i. One end of the coil conductor 32h is connected to the via conductor 34f in the vicinity of a corner C3 formed by an outer edge of the insulator layer 22h on the positive side in the x-axis direction and an outer edge of the insulator layer 22h on the positive side in the y-axis direction. In addition, the other end of the coil conductor 32h is located in the vicinity of the corner C3 and a little further toward the center of the insulator layer 22h than the one end of the coil conductor 32h, and is connected to the via conductor 34h, which penetrates through the insulator layer 22i in the z-axis direction.

The coil conductor 32j is a line-shaped conductor provided parallel to outer edges of the insulator layer 22j on both the positive and negative sides in the x-axis direction and parallel to an outer edge of the insulator layer 22j on the negative side in the y-axis direction. Therefore, the coil conductor 32j has a substantially backward C shape when viewed in plan from the z-axis direction. In addition, the upper surface of the coil conductor 32j contacts the non-magnetic material layer 26i and the lower surface of the coil conductor 32j contacts the insulator layer 22k. One end of the coil conductor 32j is connected to the via conductor 34h in the vicinity of a corner formed by an outer edge of the insulator layer 22j on the positive side in the x-axis direction and an outer edge of the insulator layer 22j on the positive side in the y-axis direction. Furthermore, the other end of the coil conductor 32j is exposed at the surface of the body 20 from the outer edge of the insulator layer 22j on the negative side in the x-axis direction and is connected to the outer electrode 40b.

Manufacturing Method

Hereafter an inductor manufacturing method of a first embodiment will be described with reference to FIG. 1, and FIGS. 3 to 20. Hereafter, a manufacturing method in which a single inductor is the target will be described, but in reality a plurality of inductors 10 are obtained by manufacturing and then cutting into individual pieces a mother body in which a plurality of bodies are connected to one another and then forming the outer electrodes 40a and 40b on the individual inductors.

First, a filler-containing heat-curable resin sheet (hereafter referred to as resin sheet) 260m is prepared. The filler included in the resin sheet 260m may be for example insulator-based fine particles such as silica, silicon carbide, or alumina. In addition, the base resin component of the resin may be for example an epoxy-based resin.

Next, as illustrated in FIG. 3, a Cu foil 320j is placed on the resin sheet 260m and the Cu foil 320j and the resin sheet 260m are subjected to press bonding. At this time, in order to remove gas from the interface between the resin sheet 260m and the Cu foil 320j, it is preferable to use a vacuum multistage press molding machine. In addition, the press bonding conditions are a temperature of around 90 to 180° C., vacuum pumping is performed for around 1 to 30 minutes and pressurization is performed for around 1 to 60 minutes at around 0.5 to 5 MPa. In addition, the press bonding may be performed with apparatuses such as rollers or a high-temperature press.

After the press bonding, heat treatment is performed in order to cure the resin sheet 260m. The heat treatment is for example performed for around 10 to 120 minutes at a temperature of around 130 to 200° C. using a high-temperature vessel such as an oven.

After the heat treatment, electroless Cu plating is performed to adjust the press-bonded Cu foil 320j to a desired thickness. Specifically, electroless Cu plating is performed on the Cu foil in a constant current mode using a plating bath in which a main component is a copper sulphate water solution. By performing the electroless plating, it is possible to control the direct current resistance of the inductor to a desired value. In addition, in order to secure plating adhesion, it is preferable to subject the resin sheet 260m, to which the Cu foil 320j has been press-bonded, to dipping treatment in an acidic cleaner as a plating pretreatment to remove an oxide film from the Cu foil 320j. After the electroless Cu plating, water washing and drying are performed. After that, heat treatment may be for example performed for around 60 to 180 minutes at a temperature of around 150 to 250° C. using a high-temperature vessel such as an oven with the aim of suppressing substrate warping after the plating formation. In this step, a technique such as deposition or sputtering may be used instead of the electroless Cu plating.

A resist pattern RP1 is formed on the Cu foil 320j whose thickness has been adjusted. Specifically, as illustrated in FIG. 4, a film resist FR1 is laminated onto the Cu foil 320j. Then, the film resist FR1 is exposed through a film mask in order to cure exposed portions of the film resist FR1. After curing the film resist FR1, uncured portions of the film resist FR1 are removed by performing developing using sodium carbonate as a developer. In this way, the resist pattern RP1 illustrated in FIG. 5 is formed on the Cu foil 320j. After that, water washing and drying are performed in order to remove the developer. Prior to the step of forming the resist pattern RP1, it is preferable that the surface of the Cu foil 320j be roughened using a buffing machine in order to improve the adhesion between the resist pattern RP1 and the Cu foil 320j and that water washing and drying be performed. Since a buffing machine uniformly processes a large surface area in a short period of time, it can handle the processing with high manufacturability and low cost and therefore it is preferable over other techniques. In addition, when performing the roughening, a technique such as milling or etching may be used instead of buffing.

The Cu foil 320j on which the resist pattern RP1 has been formed is subjected to etching in the form of wet etching and as illustrated in FIG. 6 portions of the Cu foil 320j that are not covered by the resist pattern RP1 are removed. At this time, since wet etching has a high etching rate and good penetrability into narrow and deep regions, wet etching is preferable to other techniques from the viewpoint of high manufacturability since electrode shapes having a high aspect ratio can be obtained. Here, instead of wet etching, dry etching or milling may be used.

Next, water washing is performed in order to remove any residual solution used in the wet etching. In addition, the resist pattern RP1 on the Cu foil 320j is removed using a removal solution. After that, any residual removal solution is removed using water washing and drying is performed. With this step, as illustrated in FIG. 7, a conductor pattern corresponding to the coil conductor 32j of the inductor 10 is formed on the resin sheet 260m.

As illustrated in FIG. 8, a resin sheet 260i, to which a Cu foil 320h has been press bonded, is placed on and press bonded to the resin sheet 260m on which the conductor pattern has been formed. Similarly to as described above, the press bonding conditions are at a temperature of around 90 to 180° C., vacuum pumping is performed for around 1 to 30 minutes and pressurization is performed for around 1 to 60 minutes at around 0.5 to 5 MPa using a vacuum multistage press molding machine. At this time, a spacer for regulating the amount of press bonding may be used in order to adjust the thickness of all the stacked and press bonded resin sheets. After the press bonding, heat treatment is performed in order to cure the resin sheet 260i. The heat treatment is for example performed for around 10 to 120 minutes at a temperature of around 130 to 200° C. using a high-temperature vessel such as an oven. The resin sheet 260i that has been press bonded in this step will later become the non-magnetic material layer 26i of the inductor 10 and the Cu foil 320h will become the coil conductor 32h. In addition, in this step, the resin sheet 260i may instead be press bonded onto the resin sheet 260m on which the conductor pattern has been formed and the Cu foil 320h may then be press bonded onto the resin sheet 260i.

A via is formed in Cu foil 320h and the resin sheet 260i press bonded in the previous step. In a via conductor formation step, first, a resist pattern RP2 is formed on the Cu foil 320h as illustrated in FIG. 9. In the formation of the resist pattern RP2, roughening of the surface of the Cu foil 320h, lamination of a film resist, exposure through the film mask and development are performed in this order.

Next, etching in the form of wet etching is performed on the Cu foil 320h on which the resist pattern RP2 has been formed and then the resist pattern RP2 is removed after the etching. In this way, as illustrated in FIG. 10, part of a via is formed in the Cu foil 320h. Then, a portion in which the Cu foil 320h has been removed by etching and in which the resin sheet 260i is exposed is irradiated with a laser and thereby a via that penetrates through the Cu foil 320h and the resin sheet 260i as illustrated in FIG. 11 is formed. At this time, even if the laser is radiated onto a copper foil portion, it is reflected and therefore an unwanted through hole is not opened in the copper foil. Therefore, with laser irradiation, it is possible to form a via with a more stable shape than with other techniques. However, it is also possible to form a via using a drill, dissolution or blasting for example. Specific conditions used in the formation of the resist pattern and in the etching are the same as in the case where they are performed on the Cu foil 320j.

In addition, in order to remove smears generated in the formation of the via, a desmear treatment is performed.

Plating is performed on the formed via and a via conductor is formed that connects the Cu foil 320h and the conductor pattern corresponding to the coil conductor 32j arranged at the lower surface of the resin sheet 260i. In the step of plating the via, first, a seed layer 50 is formed on the side surface of the formed via, as illustrated in FIG. 12. The via conductor is formed that connects the Cu foil 320h and the conductor pattern corresponding to the coil conductor 32j by performing electroless Cu plating using the seed layer 50 as a base, as illustrated in FIG. 13. Here, it is preferable that Cu, which is the same material as the coil conductor, be used as the plating material. Since the plating is also formed on the Cu foil 320h, the thickness of the Cu foil 320h can be adjusted to a desired thickness. The via conductor formed in this step corresponds to the via conductor 34h.

Figure 15:
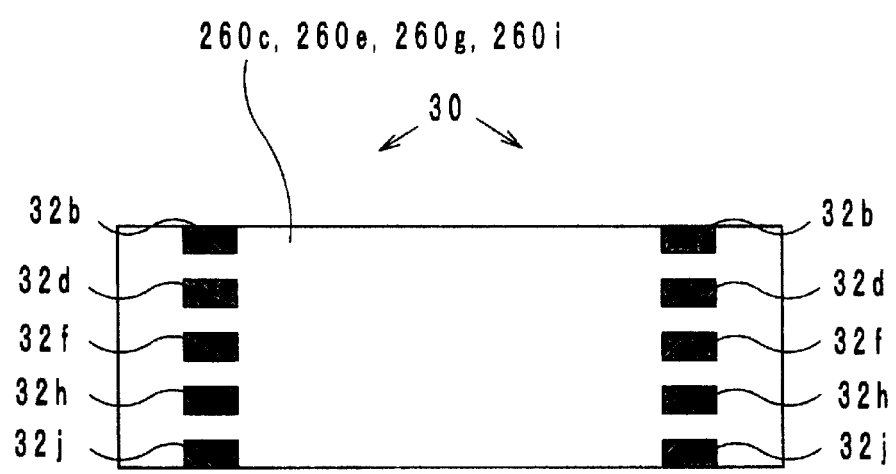
FIG. 15 is a sectional view of the inductor during its manufacture.

After forming the via conductor, similarly to as in the case of the Cu foil 320j, a conductor pattern is formed by subjecting the Cu foil 320h to a photolithography technique (resist pattern formation and etching). After that, the above-described steps of press bonding another resin sheet to which a Cu foil has been press bonded, forming a via, forming a via conductor and forming a conductor pattern are repeated until finally a resin sheet 260n is press bonded and the multilayer body composed of a non-magnetic material and including the coil 30 as illustrated in FIG. 14 is completed. After completing the multilayer body, resin on upper and lower surfaces of the multilayer body is removed by for example performing buffing, etching or using a grinder. In this way, the non-magnetic material layers on the upper surface and the lower surface of the coil 30 in the multilayer body are removed as illustrated in FIG. 15.

Figure 17:
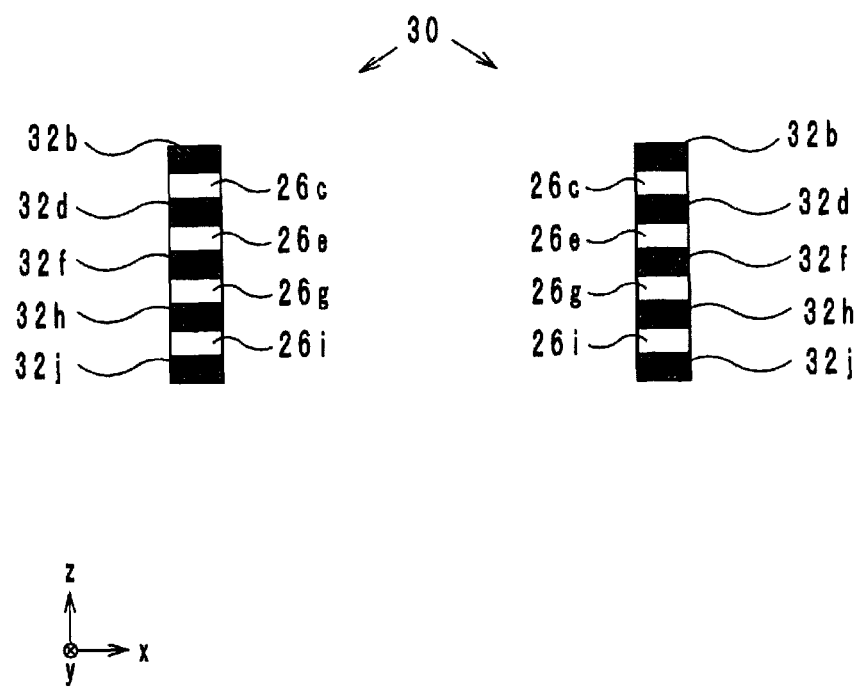
FIG. 17 is a sectional view of the inductor during its manufacture.

Next, the inner circumference of the coil 30 arranged inside the multilayer body is subjected to sandblasting and a through hole H1 is formed as illustrated in FIG. 16. The amount of heat generated in sandblasting is small since physical sputtering is used and therefore sandblasting is preferable to other techniques. In addition, $Al_2O_3$ or $SiO_2$ may be used for example as the abrasive used in sandblasting. Furthermore, resin on the outer circumferential side of the coil 30 is removed as illustrated in FIG. 17 by using a dicer, a laser or blasting for example. In this way, the non-magnetic material layers 26c, 26e, 26g and 26i included in the body 20 are completed. The through hole H1 can be instead formed using a laser or by punching for example.

Next, the multilayer body made up of just the coil 30 and the non-magnetic material layers 26c, 26e, 26g and 26i is sandwiched between magnetic powder containing resin sheets 220a and 220k and press bonding is performed, as illustrated in FIG. 18. A metal magnetic material such as an Fe—Si—Cr alloy or Fe (carbonyl) may be used as the magnetic powder contained in the resin sheets. In addition, the base resin component of the resin may be for example an epoxy-based resin. In this way, a pre-heat-treatment body 20 including the insulator layers 22a to 22k is formed in which the resin sheets containing a magnetic powder are arranged on the inside and the outside of the coil 30 and on the inside and the outside of the non-magnetic material layers 26c, 26e, 26g and 26i. After that, the body 20 is completed as illustrated in FIG. 19 by for example performing a heat treatment for around 10 to 120 minutes at a temperature of around 130 to 200° C. by using a high-temperature vessel such as an oven.

Figure 20:
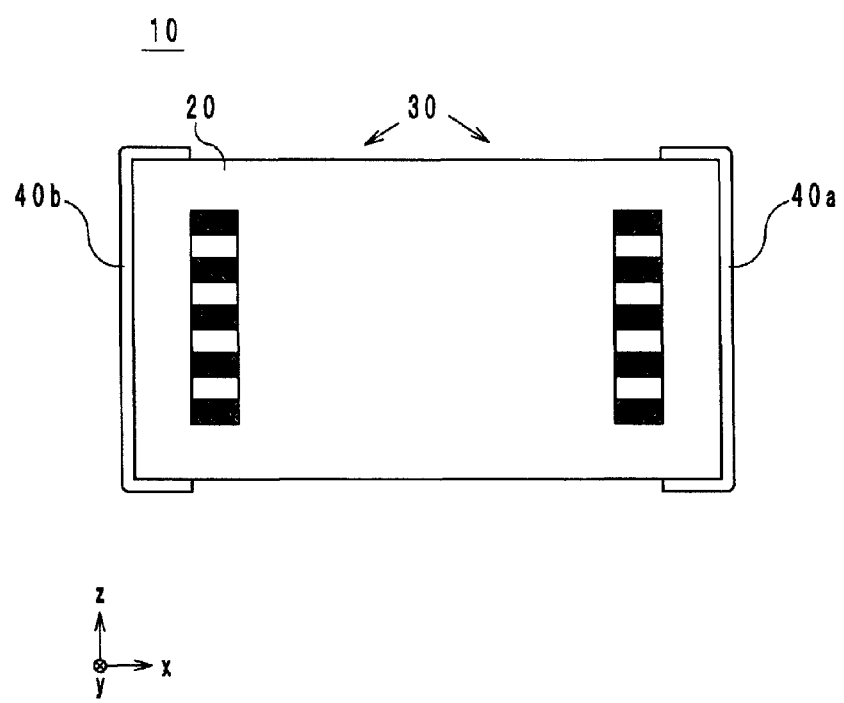
FIG. 20 is a sectional view of the inductor during its manufacture.

Finally, the outer electrodes 40a and 40b are formed on surfaces of the body 20. First, an electrode paste composed of a conductive resin material having Ag as a main component is applied to the surfaces of the body 20. Next, the applied electrode paste is subjected to heat treatment for around 5 to 120 minutes at around 80 to 200° C. for example. In addition, Ni/Sn plating is performed on the surfaces of the formed base electrodes of the outer electrodes 40a and 40b, whereby, as illustrated in FIG. 20, the outer electrodes 40a and 40b are formed. With the above-described step, the inductor 10 is completed. The outer electrodes 40a and 40b may be instead formed using a technique such as deposition or sputtering.

Effect

With the inductor manufacturing method according to the embodiment (hereafter referred to as present inductor manufacturing method), the occurrence of structural defects such as interlayer peeling and cracks can be suppressed. Specifically, in the present inductor manufacturing method, when forming non-magnetic material layers in the inductor 10, resin sheets composed of a resin are used and the resin sheets are press bonded together and cured. In addition, conductor patterns are formed by etching Cu foils. Furthermore, when forming portions that are to have magnetism, resin sheets containing a metal magnetic powder are used and the resin sheets are press bonded together and cured. Thus, the present inductor manufacturing method does not include a high-temperature heat treatment step such as sintering in which the temperature reaches around 800 to 900° C. Therefore, in the inductor 10 manufactured using the present inductor manufacturing method, the occurrence of structural defects such as interlayer peeling and cracks can be suppressed compared with the multilayer inductor manufacturing method of the related art.

In addition, in the inductor 10, a metal magnetic material is used as a material of the magnetic material layers. If such a material is exposed to a high temperature, there is a risk that changes will be generated in the magnetic characteristics such as the magnetic permeability. However, the present inductor manufacturing method does not include a high-temperature heat treatment step such as sintering. Therefore, it is not likely that changes in magnetic characteristics will be generated by a heat treatment in the inductor 10 manufactured using the present inductor manufacturing method.

Furthermore, in the present inductor manufacturing method, after manufacture of the multilayer body composed of a non-magnetic material is completed, a through hole is provided on the inner circumferential side of the coil and the through hole is filled with a resin containing a magnetic powder. Thus, with the present inductor manufacturing method, manufacture of an inductor is possible in which a non-magnetic material is provided between coil conductors and a magnetic material is provided around an inner circumference of the coil.

Modification

A method in which a multilayer body is formed by press bonding Cu foils and resin sheets onto both surfaces of the resin sheet 260m may be given as a modification of the manufacturing method of the inductor 10.

Figure 23:
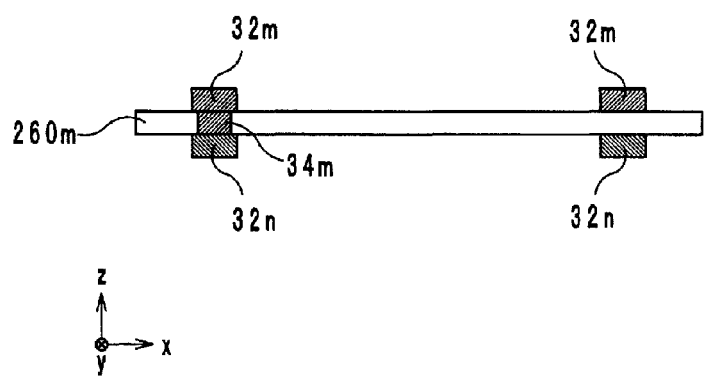
FIG. 23 is a sectional view of the inductor according to the modification during its manufacture.
Figure 24:
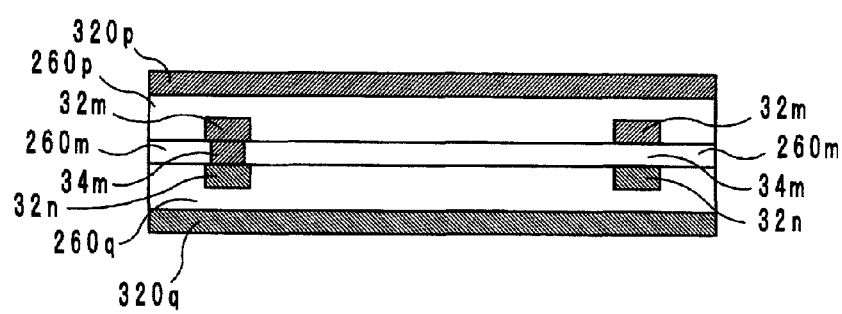
FIG. 24 is a sectional view of the inductor according to the modification during its manufacture.

Specifically, first, as illustrated in FIG. 21, Cu foils 320m and 320n are press bonded onto both surfaces of the resin sheet 260m. The resin sheet 260m is subjected to curing treatment and so forth after the press bonding and then, as illustrated in FIG. 22, a via conductor 34m that connects the Cu foils 320m and 320n is formed and, as illustrated in FIG. 23, conductor patterns 32m and 32n are formed by etching the Cu foils 320m and 320n. Next, as illustrated in FIG. 24, resin sheets 260p and 260q, onto which Cu foils 320p and 320q have been press bonded, are press bonded onto both sides of the resin sheet 260p on which the conductor patterns 32m and 32n have been formed. After forming a via conductor that connects the Cu foil 320p and the conductor pattern 32m and a via conductor that connects the Cu foil 320q and the conductor pattern 32n, a multilayer body including the coil 30 and the non-magnetic material layers 26c, 26e, 26g and 26i is formed by repeating the steps of forming a conductor pattern, press bonding a resin sheet onto which a Cu foil has been press bonded, and forming a via conductor. That is, in the manufacturing method according to this modification, conductor patterns and non-magnetic material layers are formed toward both the positive and negative sides in the z-axis direction from the resin sheet 260m, which is the non-magnetic material layer arranged in the center of the inductor 10 in the z-axis direction. In addition, the specific conditions for etching, heat treatment and so on and the content of the method other than the steps of forming the multilayer body are the same as in the inductor manufacturing method of the first embodiment.

In the manufacturing method of the inductor 10 according to the modification, as described above, the coil 30 and the non-magnetic material layers 26c, 26e, 26g and 26i are formed by press bonding Cu foils and resin sheets onto both surfaces of the resin sheet 260m. Therefore, in the manufacturing method of the inductor 10 according to the modification, the manufacturing steps can be simplified and as a result the manufacturing cost can be reduced compared with the case where the coil 30 and the non-magnetic material layers 26c, 26e, 26g and 26i are formed by press bonding Cu foils and resin sheets onto only a single surface of the resin sheet 260m.

Other Embodiments

The inductor manufacturing method according to the present disclosure is not limited to the inductor manufacturing method according to the embodiment and can be modified with the scope of the gist of the present disclosure. For example, the type of etching and the way of providing the through holes may be appropriately chosen. The techniques described in the various steps may be combined as is appropriate.

As described above, the present disclosure is of use in inductor manufacturing methods and is excellent in that it is able to suppress the occurrence of structural defects such as interlayer peeling and cracks in an inductor including a magnetic material and a non-magnetic material.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor manufacturing method for manufacturing an inductor having a helical built-in coil formed of a conductor pattern and a via conductor, the method comprising:
    a first step of press bonding a first conductor layer onto a first non-magnetic material layer composed of a non-magnetic resin;
    a second step of forming the conductor pattern by performing etching on the press-bonded first conductor layer;
    a third step of press bonding a second non-magnetic material layer composed of a non-magnetic resin onto the conductor pattern;
    a via conductor formation step of forming a via conductor penetrating through the first non-magnetic material layer or the second non-magnetic material layer and leading to the conductor pattern; and
    a step of forming a body in which a resin having magnetism is provided outside a coil by subjecting a multilayer body having a built-in coil, and obtained by a manufacturing method including the first step to the third step and the via conductor formation step, to the steps of:
        removing the non-magnetic resin from an upper surface of the multilayer body above the coil, a lower surface of the multi-layer body below the coil, and each region directly adjacent to every portion of the conductor pattern in the multi-layer body in a direction orthogonal to a stacking direction of the multi-layer body;
        interposing the multilayer body including the coil between magnetic-powder-containing resin sheets; and
        press bonding and thermally curing the magnetic-powder-containing resin sheets around the multilayer body including the coil such that the resin having magnetism is positioned directly adjacent to every portion of the conductor pattern in the multi-layer body in the direction orthogonal to the stacking direction of the multi-layer body.

2. An inductor manufacturing method for manufacturing an inductor having a helical built-in coil formed of a conductor pattern and a via conductor, the method comprising:
    a first step of press bonding a first conductor layer onto a first non-magnetic material layer composed of a non-magnetic resin;
    a second step of forming the conductor pattern by performing etching on the press-bonded first conductor layer;
    a third step of press bonding a second non-magnetic material layer composed of a non-magnetic resin onto the conductor pattern;
    a fourth step of press bonding a second conductor layer onto the second non-magnetic material layer;
    a fifth step of forming a via penetrating through the second conductor layer and the second non-magnetic material layer and leading to the conductor pattern;
    a sixth step of forming the via conductor by performing plating on the via; and
    a step of forming a body in which a resin having magnetism is provided outside a coil by subjecting a multilayer body, which has a built-in coil and is obtained by repeating the second step to the sixth step, to the steps of:
        removing the non-magnetic resin from each region directly adjacent to every portion of the conductor pattern in the multilayer body in a direction orthogonal to a stacking direction of the multilayer body; and
        press bonding after the sixth step while interposed between magnetic-powder-containing resin sheets and then thermally curing the magnetic-powder-containing resin sheets such that the resin having magnetism is positioned directly adjacent to every portion of the conductor pattern in the multi-layer body in the direction orthogonal to the stacking direction of the multi-layer body.

3. The inductor manufacturing method according to claim 2, further comprising a through hole formation step of, after the sixth step and before the step of forming the body, forming a through hole in the multilayer body, which has a built-in coil and is obtained by repeating the second step to the sixth step, by removing resin located inside the coil.

* * * * *